United States Patent
Miyashita et al.

(10) Patent No.: US 7,375,487 B2
(45) Date of Patent: May 20, 2008

(54) GEARED MOTOR

(75) Inventors: Kunio Miyashita, Azumino (JP); Junji Koyama, Azumino (JP); Muneo Mitamura, Azumino (JP); Yasuo Sawamura, Komagane (JP)

(73) Assignee: Harmonic Drive Systems Inc., Tokyo (JP)

( * ) Notice: Subject to any disclaimer, the term of this patent is extended or adjusted under 35 U.S.C. 154(b) by 292 days.

(21) Appl. No.: 11/361,972

(22) Filed: Feb. 27, 2006

(65) Prior Publication Data
US 2006/0192517 A1 Aug. 31, 2006

(30) Foreign Application Priority Data
Feb. 28, 2005 (JP) ............................. 2005-053188

(51) Int. Cl.
*G05B 19/29* (2006.01)

(52) U.S. Cl. ...................... 318/602; 318/603; 318/652

(58) Field of Classification Search ................ 318/600, 318/601, 602, 603, 652, 727
See application file for complete search history.

(56) References Cited

U.S. PATENT DOCUMENTS

| | | | |
|---|---|---|---|
| 4,312,033 A * | 1/1982 | Sweeney et al. .............. 700/56 |
| 5,187,724 A * | 2/1993 | Hibino et al. .................. 377/17 |
| 6,917,034 B2 * | 7/2005 | Iino et al. .............. 250/231.13 |
| 2003/0079330 A1 * | 5/2003 | Stopher et al. ............... 29/430 |

* cited by examiner

Primary Examiner—Rina Duda
(74) Attorney, Agent, or Firm—Buchanan Ingersoll & Rooney PC

(57) ABSTRACT

A motor encoder is mounted on a motor shaft of a geared motor 1, and the origin position is detected by using a Z-phase signal. An absolute value encoder with a precision that allows the number of motor rotations to be determined is mounted on an output shaft 4 of a reduction gear, and the absolute rotational position thereof is detected. When the first Z-phase signal generated in conjunction with the rotation of the motor shaft 2a is obtained at startup and at other times, the mechanical starting point at which the motor shaft and output shaft are both positioned at the origin can be calculated based on the absolute rotational position of the reduction-gear output shaft obtained from the output-side absolute value encoder. Since the mechanical starting point is obtained by rotating the motor shaft a single rotation at most, the time required to calculate the mechanical starting point is short in comparison with conventional examples, and extraneous rotational movements can be avoided.

13 Claims, 12 Drawing Sheets

Fig.6

TABLE OF AREA DETERMINATIONS
CORRESPONDING TO
THE OUTPUT SHAFT POSITIONS

| P | A |
|---|---|
| 0 | |
| ⋮ | ⋮ |
| $P_a$ | 1 |
| $P_a +$ | 1 |
| ⋮ | 1 |
| $P_b -$ | 1 |
| $P_b$ | 2 |
| $P_b +$ | 2 |
| ⋮ | 2 |
| $P_c -$ | 2 |
| $P_c$ | 3 |
| $P_c +$ | 3 |
| ⋮ | ⋮ |
| $P_m$ | |

GEARED MOTOR

BACKGROUND OF THE INVENTION

1. Field of the Invention

The present invention relates to a geared motor, and more particularly to a geared motor that can rapidly and precisely detect the mechanical starting point of an output shaft of a reduction gear during motor startup and at other times.

2. Description of the Related Art

Geared motors are used that are configured to output the rotational output of a motor in the drive section of industrial robots, machine tools, and the like via a reduction gear having high transmission accuracy. Such drive sections require high positioning accuracy. As shown in FIG. 11, a geared motor 101 has a motor main body 102, a reduction gear 103 coaxially connected to a motor shaft 102a of the motor main body 102, and an output shaft 104 coaxially connected to the output side of the reduction gear 103. A wave gear drive, for example, is used as the reduction gear 103.

In a geared motor 101, the rotational angle of the output shaft 104 of the reduction gear 103 must be controlled with high precision for accurate positioning or the like. For this reason, a motor encoder 106 is mounted on the motor shaft 102a, and an origin sensor 107 is mounted on the output shaft 104.

In a signal processing circuit 108, based on the A-, B-, and Z-phase signals obtained from the motor encoder 106, and the origin signal S that generates a single pulse per single rotation and is obtained from the origin sensor 107, commands are sent to the motor driver 109 so that the output shaft 104 achieves a desired rotational angle. The motor driver 109 rotatably drives the motor shaft 102a in accordance with commands thus received.

In the geared motor 101, the rotational angle position of the output shaft 104 is controlled based on the mechanical starting point of the shaft. Therefore, at startup and at other times, the output shaft 104 must be returned to the mechanical starting point (origin position).

Nevertheless, there is a problem in a conventional geared motor in that a considerable amount of time is required in the origin return movements. More specifically, as shown in FIG. 12, in the origin return movements of the output shaft 104, it is necessary that the motor shaft 102a be rotated (first movement) until an origin signal is output from the origin sensor 107 mounted on the output shaft 104, the motor shaft 102a then be rotated in the opposite direction to return the output shaft 104 (second movement) to the rotational angle position at a point just before the origin signal S is output, and the motor shaft 102a be again rotated in the forward direction and stopped (third movement) in the rotational position at which the first Z-phase signal is output following the output of the origin signal.

In these movements, the motor shaft 102a must be rotated by an amount equal to the rotational angle that corresponds to the reduction gear ratio of the reduction gear at most. When the reduction gear ratio is 1:50, for example, the motor shaft 102a must be rotated 50 times, that is, 18,000 degrees (50×360°), and a considerable amount of time is required.

SUMMARY OF THE INVENTION

An main object of the present invention is to provide a geared motor that can rapidly carry out movements for ascertaining the mechanical starting point with good accuracy.

In order to solve the above and other problems, the present invention provides a geared motor in which a reduction gear is connected to a motor shaft, having a motor encoder for outputting A-, B-, and Z-phase signals in accompaniment with the rotation of the motor shaft; an output-side absolute value encoder for detecting the absolute rotational position of an output shaft of the reduction gear; and a drive control circuit for obtaining the mechanical starting point of the motor shaft and the output shaft on the basis of the detection value of the motor encoder and the absolute value encoder, wherein the absolute value encoder has a precision that allows the rotational angle of the output shaft per single rotation of the motor shaft to be detected.

In this case, the drive control circuit computes the mechanical starting point on the basis of the absolute rotational position obtained from the output-side absolute value encoder when the first Z-phase signal obtained from the motor encoder is generated during motor startup and at other times.

In the present invention, the absolute rotational position of the reduction-gear output shaft is detected by an absolute value encoder. Thus, the mechanical starting point at which both the motor shaft and the output shaft are positioned at the origin can be obtained based on the absolute rotational position of the reduction-gear output shaft at the point at which the first Z-phase signal generated in accompaniment with the rotation of the motor shaft is obtained at motor startup and at other times. In other words, since the mechanical starting point is obtained by merely rotating the motor shaft 360° (with only a single rotation) at most, the time required to obtain the mechanical starting point is reduced in comparison with prior art, and extraneous rotational movement can be avoided.

Next, the drive control circuit of the present invention carries out origin return movements comprising a first movement in which the motor shaft is rotated in the forward direction at a first speed until the first the Z-phase signal is output, a second movement in which the motor shaft is rotated in the reverse direction at a second speed and returned to an angular position just before the Z-phase signal is output, and a third movement in which the motor shaft is rotated in the forward direction at a third speed and the motor shaft is stopped at the point where the Z-phase signal is output, and returns the motor shaft to the mechanical starting point.

Due to the backlash and torsion in this geared motor, application of a load torque causes the output shaft of the reduction gear to rotate a slight angle even when the motor shaft (reduction gear input shaft) is fixed. The output-side absolute value encoder has a prescribed detection error, and the result of adding a small angle thereto is the estimated error when determining the number of rotations N of the motor shaft. Therefore, when the number of rotations of the motor shaft is determined from the detection position of the output-side absolute value encoder mounted on the output shaft, if the above error is not considered, the number of rotations of the motor shaft cannot be accurately calculated. More specifically, the detection value of the output-side absolute value encoder is divided by the rotational angle of the output shaft per single rotation of the motor shaft, and when the number of rotations of the motor shaft is computed, the result is affected by the error just before and after the switch point of the number of rotations of the motor shaft, and there is a possibility that the computed number of rotations of the motor shaft will differ from the actual number of rotations of the motor shaft.

In view of the above, in the present invention, a non-determination zone that is larger than the error described above is envisioned in the rotational angle range of the output shaft that includes the switch point of the number of rotations of the motor shaft. The zone is set in advance so that a Z-phase signal is generated in a single rotation of the motor shaft in a rotational angle range of the output shaft that lies outside of the above rotational angle range, and the number of rotations of the motor shaft can be computed without being affected by the error.

In other words, in the present invention, the rotational position P of the output shaft is set in advance so as to fall within the following range when the Z-phase signal is generated, where θ is the rotational angle of the output shaft per single rotation of the motor shaft, N is the number of rotations of the motor shaft, and Δ is a value that is larger than the error contained in the detection value of the output-side absolute value encoder.

$$\theta(N-1)+\Delta \leq P \leq \theta N-\Delta$$

In this case, the drive control circuit computes the number of rotations N of the motor shaft by using the aforementioned relationship and the detection angle of the output-side absolute value encoder, and computes the position Px of the output shaft as follows by using the number of rotations N, the rotational angle p of the motor shaft at the point at which the Z-phase signal is generated, and the gear ratio R of the reduction gear.

$$Px=(N\times 360°+p)/R$$

In the present invention, when the reduction gear is coaxially connected to the front end of the motor shaft, and the motor encoder is disposed at the rear-end portion of the motor shaft, the output-side absolute value encoder may be disposed at the rear-end portion of the rotating shaft, which coaxially passes through the motor shaft and extends to the rear-end side thereof from the output shaft. It is apparent that the output-side absolute value encoder may also be disposed at the front end of the output shaft.

Next, the geared motor of the present invention has an input-side absolute value encoder for detecting the absolute rotational position of a motor shaft; an output-side absolute value encoder for detecting the absolute rotational position of the output shaft of a reduction gear connected to the motor shaft; and a drive control circuit for calculating the mechanical starting point of the motor shaft and the output shaft on the basis of the detection value of the input-side absolute value encoder and the output-side absolute value encoder, wherein the output-side absolute value encoder has a precision that allows the rotational angle of the output shaft per single rotation of the motor shaft to be detected.

In this case as well, when the number of rotations of the motor shaft is determined from the detection position of the output-side absolute value encoder mounted on the output shaft, the number of rotations of the motor shaft cannot be accurately calculated if the error described above is not considered.

In view of the above, the number of rotations Na of the motor shaft at the start of rotation is computed in the drive control circuit of the present invention in the following manner in accordance with the detection position p of the input-side absolute value encoder and the detection position Pa of the output-side absolute value encoder at the start of rotation of the motor shaft, where θ is the rotational angle of the output shaft per single rotation of the motor shaft, N is the number of rotations of the motor shaft, and Δ is a value that is larger than the error contained in the detection value of the output-side absolute value encoder.

(1) The actual number of rotations Na of the motor shaft is set as N when $\theta(N-1)+\Delta \leq Pa \leq \theta N-\Delta$.

(2) When $\theta(N-1) \leq Pa < \theta(N-1)+\Delta$, the number of rotations Na is set to N if p<pn, and the number of rotations Na is set to (N−1) if p>pn, where pn is a predetermined value.

(3) When $\theta N-\Delta < Pa \leq \theta N$, the number of rotations Na is set to N if p>pn, and the number of rotations Na is set to (N+1) if p<pn.

The position Px of the output shaft can be computed as follows by using the thus calculated number of rotations Na, the detection position p of the input-side absolute value encoder, and the gear ratio R of the reduction gear.

$$Px=(Na\times 360°+p)/R$$

Instead of computing the number of rotations Na in this manner, it is possible to make a determination as to whether the detection position Pa of the output-side absolute value encoder falls within the range described in (1) above when the motor shaft begins rotation. The actual number of rotations Na of the motor shaft is set to be N when the detection position Pa is within the range, the motor is rotated until the detection position Pa is within the range when the detection position Pa is outside the range, and the actual number of rotations Na of the motor shaft is thereafter set to be N.

Here, when the reduction gear is coaxially connected to the distal end of the motor shaft, and the input-side absolute value encoder is disposed in the rear-end portion of the motor shaft, the output-side absolute value encoder may be disposed at the rear-end portion of the rotating shaft, which coaxially passes through the motor shaft and extends to the rear end side thereof from the output shaft. It is apparent that the output-side absolute value encoder may also be disposed at the distal end portion of the output shaft.

The geared motor of the present invention is adapted to detect the absolute rotational angle position of the output shaft of the reduction gear. Therefore, the mechanical starting point of the output shaft can be calculated based on the origin position of the motor shaft. Thus, in comparison with the prior art in which the origin point of both shafts is actually detected and the mechanical starting point is ascertained, the mechanical starting point can be rapidly calculated, and wasteful rotational movements can be omitted. Since the number of rotations of the motor shaft is computed with consideration given to the error contained in the detection value of the output-side absolute value encoder, the mechanical starting point can be calculated with good precision.

The geared motor of the present invention is also adapted to detect the absolute rotational angle position of both the motor shaft and the output shaft of the reduction gear. A resulting advantage is that there is no need to perform rotation in order to calculate the mechanical starting point of the shafts. Since the number of rotations of the motor shaft is computed with consideration given to the error contained in the detection value of the output-side absolute value encoder, the mechanical starting point can be calculated with good precision.

BRIEF DESCRIPTION OF THE DRAWINGS

FIG. 6 is a descriptive diagram showing the area determination for computing the number of rotations of the motor shaft in the geared motor of FIG. 5;

DESCRIPTION OF THE PREFERRED EMBODIMENTS

The embodiments of the present invention are described below with reference to the drawings.

Embodiment 1

Figure 1:
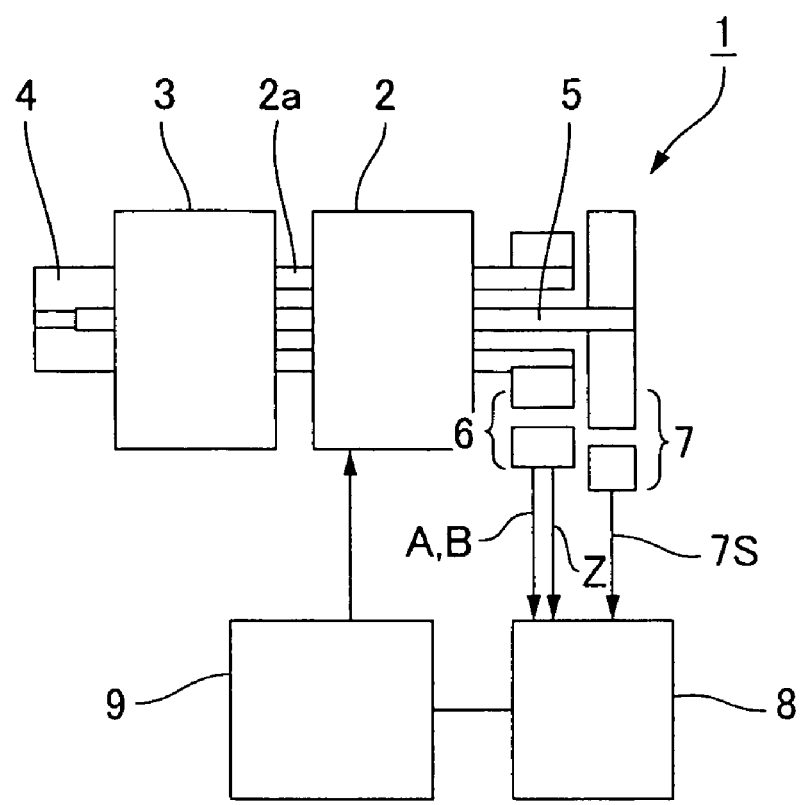
FIG. 1 is a schematic structural diagram of the geared motor according to the first embodiment in which the present invention has been applied.

FIG. 1 is a schematic structural diagram showing a geared motor in which the present invention has been applied. The geared motor 1 has a motor main body 2, a wave reduction gear 3 coaxially connected to a motor shaft 2a extending from the front end of the motor main body 2, and an output shaft 4 coaxially connected to the front end of the wave reduction gear 3.

The wave reduction gear 3 is a cup-shaped wave reduction gear, for example, and has an annular rigid internally toothed gear, a cup-shaped flexible externally toothed gear disposed inside thereof, and an elliptically contoured wave generator (not shown) fitted therein. When the wave generator rotates, the meshing position of the flexible externally toothed gear with the annular rigid internally toothed gear moves circumferentially, and a relative rotation is generated in accordance with the difference in the number of internal and external teeth. The rigid internally toothed gear is ordinarily the fixed side, the cup-shaped flexible externally toothed gear rotates at a reduced speed, and the reduced rotation is output from the output shaft 4 connected to the thick boss portion formed on the bottom of the cup. Another form of a reduction gear may be also used, and application can naturally be made in a similar manner when, for example, a planetary reduction gear or a Cyclo Drive (trademark) is used.

A rotating shaft 5 that integrally rotates with the output shaft 4 is coaxially connected to the output shaft 4. The rotating shaft 5 coaxially passes through the inside of the wave reduction gear 3 and the motor shaft 2a, extends to the rearward side, and projects rearward from the rear-end opening of the motor shaft 2a.

A motor encoder 6 is mounted on the rear-end portion of the motor shaft 2a. A- and B-phase signals that differ in phase by 90° are output from the motor encoder 6 in conjunction with the rotation of the motor shaft 2a, and a single-pulse Z-phase signal that indicates the position of the origin is output with each rotation. An output-side absolute value encoder 7 is mounted on the rear-end portion of the rotating shaft 5 that integrally rotates with the output shaft 4. The output-side absolute value encoder 7 can detect the absolute rotational angle position in a single rotation of the output shaft 4.

The resolution of the output-side absolute value encoder 7 is set to a value that allows the rotational speed of the output shaft 4 to be detected. In the present example, the resolution is set to be the same value as that for the rotational angle of the output shaft 4 per single rotation of the motor shaft. When the reduction ratio of the wave reduction gear 3 is 1:50, the resolution is set to 360°/50=7.20°, for example. An absolute position signal 7S that indicates the absolute rotational position of the output shaft 4 is output from the absolute value encoder 7.

Each of the detection signals of the motor encoder 6 and output-side absolute value encoder 7 are each fed to a drive control circuit 8. The drive control circuit 8 outputs a position command to a motor driver 9 on the basis of the detection signals. The motor driver 9 drives the motor main body 2 so that the output shaft 4 yields a target rotational angle position corresponding to the position command.

Figure 2A:
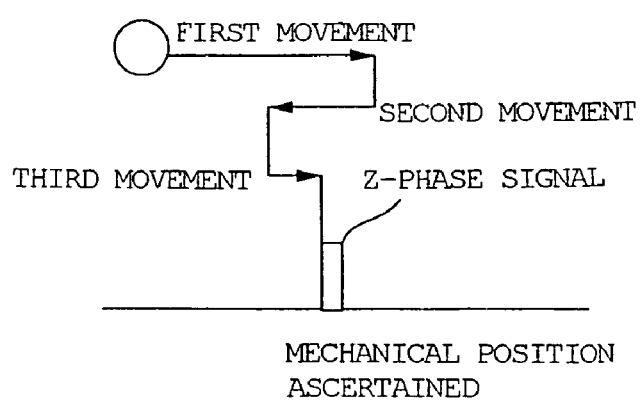
FIG. 2A is a descriptive diagram showing the movements for obtaining the mechanical starting point in the geared motor of FIG. 1.

FIG. 2A is a descriptive diagram showing the movements for ascertaining the mechanical starting point when the geared motor 1 begins to move and at other times. When the power is switched on, the geared motor 1 drives the motor main body 2 via the motor driver 9, and the motor shaft 2a thereof is returned to the origin position. More specifically, the motor shaft 2a is returned to the rotational position (origin position) at which the first Z-phase signal is obtained from the motor encoder. The origin return movements entail rotating the motor shaft 2a at a first speed until the first Z-phase signal is output (first movement), subsequently rotating the motor shaft 2a in the reverse direction at a second speed and returning the shaft to the angular position just before the Z-phase signal is output (second movement), and thereafter again rotating the motor shaft 2a in the forward direction at a third speed and stopping the motor shaft 2a at the point where the Z-phase signal is output (third movement). The third speed is considerably slower than the first speed.

Here, when the first Z-phase signal is output, the absolute rotational angle position of the output shaft 4 obtained from the output-side absolute value encoder 7 is read. Since the rotational angle of the output shaft 4 per single rotation of the motor shaft is known, the origin position of the output shaft 4 is calculated from the absolute rotational position. When the detected absolute rotational position is 72°, for example, the motor shaft 2a is returned ten rotations and the point at which the Z-phase signal is obtained is the origin position of the output shaft 4.

Figure 2B:
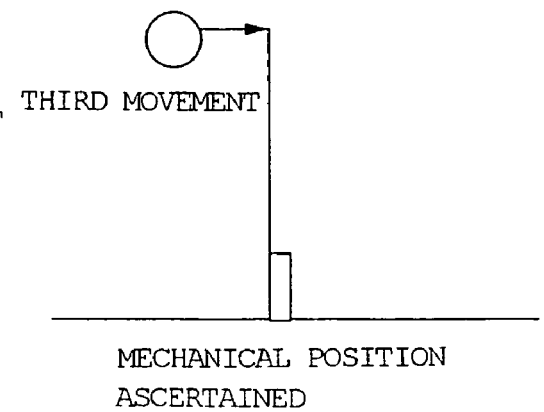
FIG. 2B is a descriptive diagram showing the movements for obtaining the mechanical starting point in the geared motor of FIG. 1.

Thus, in the present example, the mechanical starting point in which motor shaft 2a and output shaft 4 have each returned to the origin positions is calculated using the output-side absolute value encoder 7 mounted on the output shaft 4. Therefore, the movements for returning the output shaft 4 to the origin position are not required, the time required to ascertain the mechanical starting point can be reduced by an equivalent amount of time, and extraneous rotational movements can be omitted. It is also possible to calculate the mechanical starting point by carrying out only the third movement, as shown in FIG. 2B.

In the case in which, for example, a galvano mirror is mounted on the output shaft 4 and the galvano mirror is rotated reciprocally at a prescribed swing angle, an end limit sensor must be mounted on the output shaft 4 in the prior art. If the present invention is applied, there is an advantage in that the device can be compactly configured because there is no requirement for an end limit sensor to be mounted.

Figure 3:
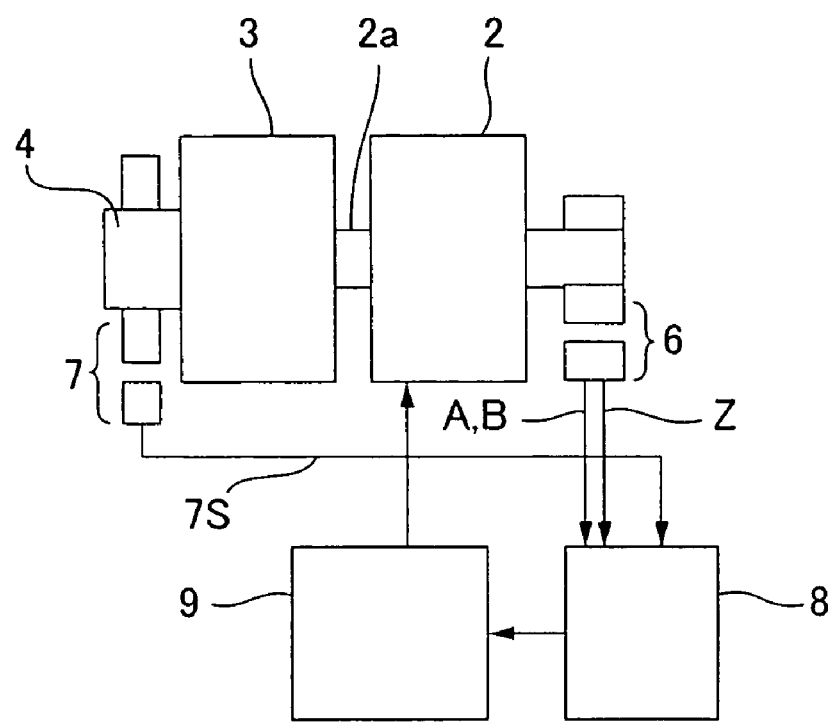
FIG. 3 is a schematic structural diagram showing another configurational example of a geared motor.

It is also possible to mount an absolute value encoder 7 at the distal end of the output shaft 4, as shown in FIG. 3.

In this case, the number of rotations of the motor shaft 2a is calculated in the drive control circuit 8 of the present example in the following manner. Because backlash and torsion are generated in a geared motor, the output shaft of the reduction gear commonly rotates a slight angle even when the motor shaft (input shaft to the reduction gear) is fixed. Because of this, there are cases in which the number of rotations of the motor shaft cannot be determined solely from the detection value of the absolute value encoder (two-pole encoder) mounted on the output shaft. More specifically, in a prescribed rotational angle range of the output shaft, which includes the switch point of the number of rotations of the motor shaft, the number of rotations of the motor shaft cannot be determined solely from the detection value of the absolute value encoder mounted on the output shaft.

In other words, in the geared motor 1, the output shaft 4 of the reduction gear 3 rotates a slight angle under a load torque due to backlash and torsion, even when the motor shaft 2a (reduction gear input shaft) is fixed. The output-side absolute value encoder 7 has a prescribed detection error, and the result of adding a small angle thereto is the estimated error $\Delta$ when determining the number of rotations N of the motor shaft. Therefore, when the number of rotations N of the motor shaft 2a is determined from the detection position of the output-side absolute value encoder 7 mounted on the output shaft, the number of rotations N of the motor shaft cannot be accurately calculated if the above error is not considered. In other words, the detection value of the output-side absolute value encoder 7 is divided by the rotational angle $\theta$ of the output shaft per single rotation of the motor shaft, and when the number of rotations N of the motor shaft 2a is computed, the result is affected by the error just before and after the switch point of the number of rotations of the motor shaft 2a, and there is a possibility that the computed number of rotations N of the motor shaft will differ from the actual number of rotations of the motor shaft 2a.

Figure 4:
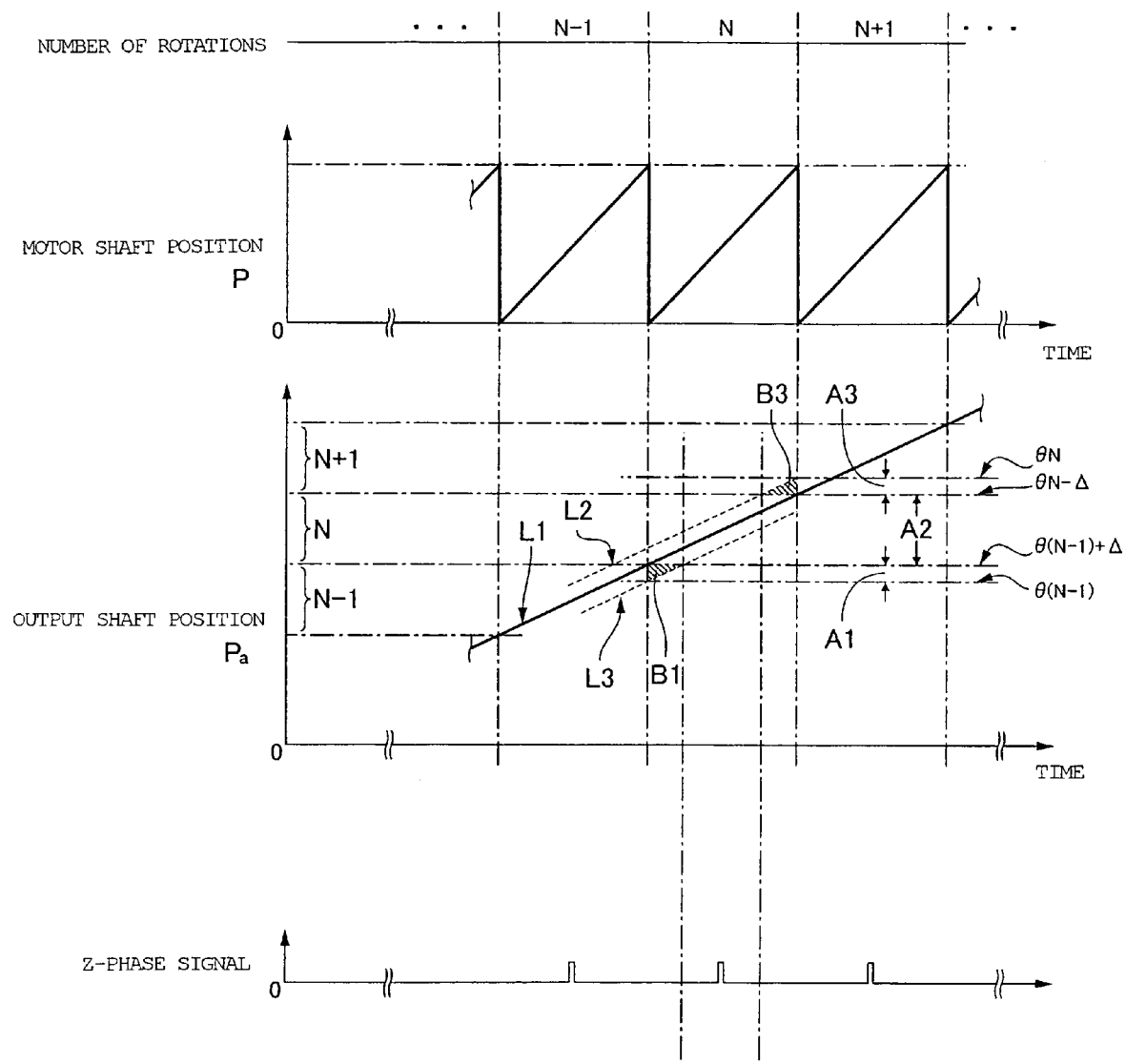
FIG. 4 is a descriptive diagram showing the method for computing the number of rotations of the motor shaft.

In view of the above, in the present example, non-determination zones A1 and A3 that are larger than the error described above are envisioned in the rotational angle range of the output shaft 4 that includes the switch point of the number of rotations of the motor shaft 2a, as shown in FIG. 4. The zone is set in advance so that a Z-phase signal is generated in each rotation of the motor shaft within a rotational angle range A2 (determination zone) of the output shaft 4 that lies outside of the above rotational angle range, and the number of rotations N of the motor shaft 2a can be computed without being affected by the error.

In other words, the rotational position Pa of the output shaft 4 is set in advance so as to fall within the following range when the Z-phase signal is generated, where $\theta$ is the rotational angle of the output shaft 4 per single rotation of the motor shaft, N is the number of rotations of the motor shaft, and A is a value that is larger than the error contained in the detection value of the output-side absolute value encoder 7.

$$\theta(N-1)+\Delta \leq Pa \leq \theta N-\Delta$$

Therefore, the drive control circuit 8 can compute the number of rotations N of the motor shaft 2a from the detection value Pa of the output-side absolute value encoder 7 without being affected by the error. The position Px of the output shaft 4 can be computed as follows by using the computed number of rotations N, the rotational angle p of the motor shaft 2a at the point at which the Z-phase signal is generated, and the gear ratio R of the reduction gear.

$$Px=(N\times 360°+P)/R$$

Embodiment 2

Figure 5:
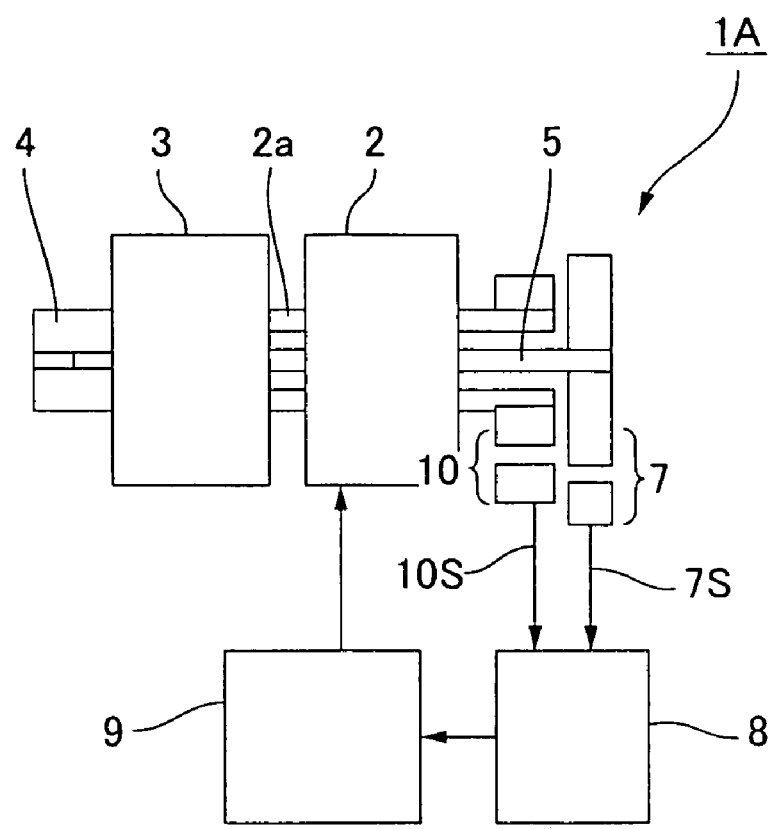
FIG. 5 is a schematic structural diagram showing a configurational example of the geared motor according to the second embodiment in which the present invention has been applied.

Next, FIG. 5 is a schematic structural diagram showing another example of a geared motor in which the present invention has been applied. Since the basic configuration of the geared motor 1A shown in the diagram is the same as that of FIG. 1, the same reference numerals are assigned to the corresponding locations and a description thereof is omitted.

In the geared motor 1A of the present example, the difference is that an input-side absolute value encoder 10 is mounted on the motor shaft 2a. When absolute value encoders 7 and 10 are disposed on both of the shafts 2a and 4, and when the power is switched on, the mechanical starting point is immediately calculated from the absolute rotational angle positions (signals 10S and 7S) of the shafts 2a and 4 obtained from the two absolute value encoders 7 and 10. Thus, rotation movements for ascertaining the mechanical starting point are not required at startup and at other times.

In the present example as well, when the number of rotations of the motor shaft 2a is determined from the detection position of the output-side absolute value encoder 7 mounted on the output shaft 4, the number of rotations of the motor shaft 2a cannot be accurately calculated without giving consideration to the error described above.

In view of the above, the number of rotations Na of the motor shaft 2a at the start of rotation is computed in the drive control circuit 8 of the present example in the following manner in accordance with the detection position p of the input-side absolute value encoder and the detection position Pa of the output-side absolute value encoder 7 at the point at which the motor shaft 2a begins rotation, where $\theta$ is the rotational angle of the output shaft 4 per single rotation of the motor shaft, N is the number of rotations of the motor shaft 2a, and $\Delta$ is a value that is larger than the error contained in the detection value of the output-side absolute value encoder 7.

(1) The actual number of rotations Na of the motor shaft is set as N when $\theta(N-1)+\Delta \leq Pa \leq \theta N-\Delta$.

(2) When $\theta(N-1) \leq Pa < \theta(N-1)+\Delta$, the number of rotations Na is set to N if p<pn, and the number of rotations Na is set to (N−1) if p>pn, where pn is a predetermined value as described below.

(3) When θN−Δ<Pa≦θN, the number of rotations Na is set to N if p>pn, and the number of rotations Na is set to (N+1) if p<pn.

The position Px of the output shaft 4 is computed as follows using the number of rotations Na set in this manner, the detection position p of the input-side absolute value encoder 10, and the gear ratio R of the reduction gear, and the main movement is started.

$$Px = (Na \times 360° + p)/R$$

The determination method is described in detail below with reference to FIG. 4. Since the error as described above is included in the output-side absolute value encoder 7, the detection value increases and decreases by an amount equal to the error centering around the detection value in the case that there is no error indicated by the solid line L1 in FIG. 4. Therefore the detection value Pa fluctuates within the range of the dotted lines L2 and L3 drawn above and below the solid line L1.

For this reason, there are cases in which the number of rotations N calculated from the detection value Pa of the output-side absolute value encoder 7 does not match the actual number of rotations Na of the motor shaft 2a. In other words, in the area shown by the sloped line B1 in FIG. 4, the number of rotations of the motor shaft 2a is calculated to be one less rotation (N−1). Conversely, in the area shown by the sloped line B3, the number is calculated to be one rotation more (N+1). The actual number of rotations can be calculated in the other areas.

Here, the detection value p of the input-side absolute value encoder 10 is low in the area of the sloped line B1, and is close to the maximum value pm in the area of the sloped line B3. In the present example, therefore, the number of rotations Na of the motor shaft 2a is set to be N when the detection value p of the input-side absolute value encoder 10 is less than the predetermined value pn in the area A1 that contains the sloped line B1, that is, in the case of (2) described above. When this is not the case, the number is set to be one rotation less (N−1) and a misdetection of the number of rotations due to the error is prevented. In a similar fashion, the number of rotations Na of the motor shaft 2a is set to be N when the detection value p of the input-side absolute value encoder 10 is greater than the predetermined value pn in the area A3 that contains the sloped line B3, that is, in the case of (3) described above. When this is not the case, the number is set to be one rotation greater (N+1) and a misdetection of the number of rotations due to the error is prevented. In the intermediate area A2, that is, in the case of (1) described above, the number of rotations is set unchanged as N because there is no chance of a misdetection due to error.

It is generally possible to adopt a value that is half of the maximum value pm of the detected value p as the value pn. In the cases of (2) and (3), it is also possible to adopt a different value for pn as the determination criterion.

Figure 7:
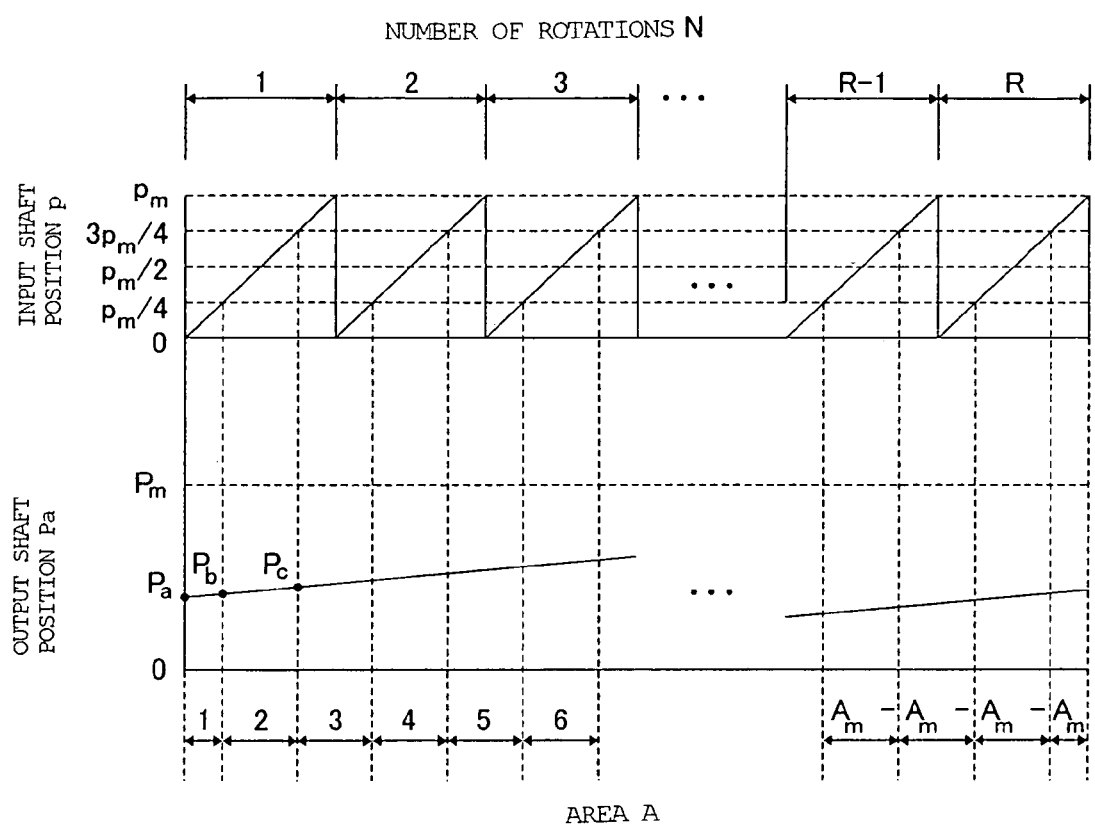
FIG. 7 is a descriptive diagram showing the method for computing the number of rotations of the motor shaft in the geared motor of FIG. 5.

Next, the computational control of the number of rotations described above can be carried out with reference to a correspondence table created in advance, as shown in FIG. 6, for example. The correspondence table is a table of area determinations that are assigned in advance to the positions of the output shaft 4. The odd-numbered areas correspond to the rotational angle range of the output shaft 4 that includes the switch point of the number of rotations of the motor shaft 2a, as shown in FIG. 7. These areas are non-determination zones that are larger than the error described above, and correspond to the cases of (2) and (3) described above. The even-numbered areas are determination zones, and correspond to the case of (1) described above.

Figure 8:
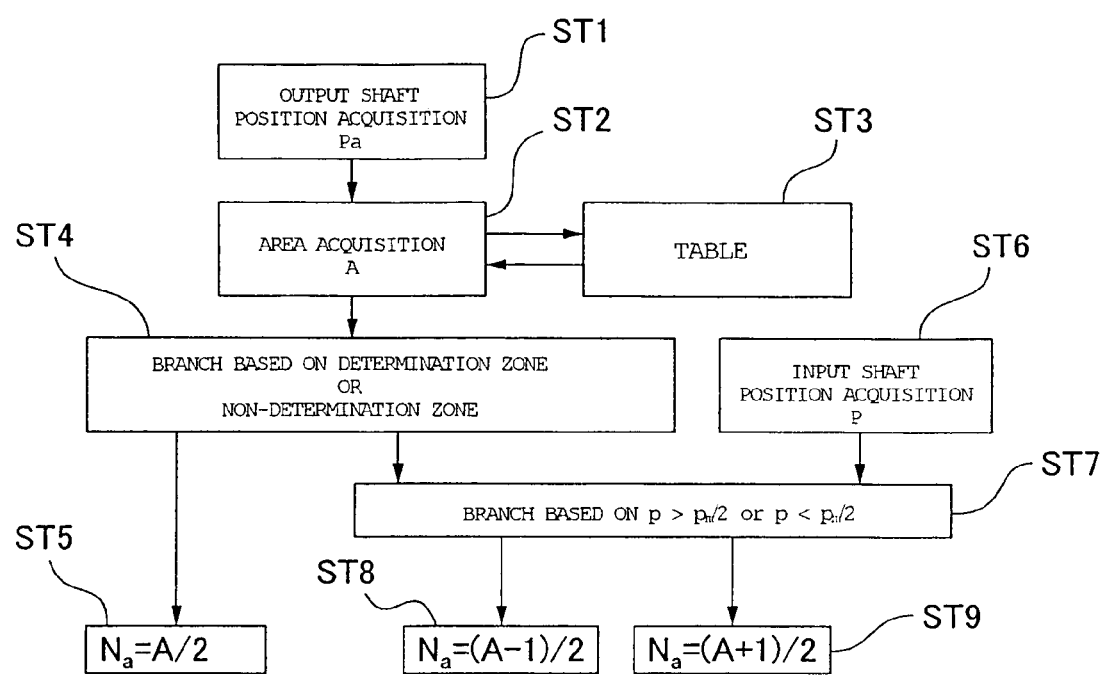
FIG. 8 is a descriptive diagram showing the computational flow for determining the number of rotations of the motor shaft in the geared motor of FIG. 5.

FIG. 8 shows the flow of computational control of the number of rotations, carried out with reference to the correspondence table. When the position is in a determination zone, the value resulting from dividing the corresponding area number by "2" is the number of rotations (step ST1→ST2 and 3→ST4→ST5). When the position is in a non-determination zone, reference is made to the detection value p of the input-side absolute value encoder 10, and if the value is greater than pm/2, the value obtained by subtracting "1" from the area number and dividing the result by "2" is taken as the number of rotations (step ST1→ST2 and 3→ST4→ST6 and 7→ST8). Conversely, when the detection value p is less than pm/2, the value obtained by adding "1" to the area number and dividing the result by "2" is used as the number of rotations (step ST1→ST2 and 3→ST4→ST6 and 7→ST9)

Here, if the detection value Pa of the output-side absolute value encoder 7 at the start of rotation of the motor shaft 2a is in the non-determination zone, the motor shaft 2a may be rotated and driven/controlled so that the detection value Pa is within the determination zone.

Next, when the number of rotations Na is calculated as described above, the angular reproducibility of the output-side absolute value encoder 7 must be ±360/(R×4) [°], where R is the gear ratio of the reduction gear 3. However, if the following method is adopted, the number of rotations Na can be accurately calculated even if the angular reproducibility of the output-side absolute value encoder 7 is half the value, that is, ±360/(R×2) [°]. The reference numerals in the description below have the following meanings.

Ri: Resolution of the input-side absolute value encoder 10
Ro: Resolution of the output-side absolute value encoder 7
Air: Actual absolute value of the input-side absolute value encoder 10 (0 to (Ri−1))
Alt: Provisional absolute value of the input-side absolute value encoder 10 (0 to (Ri−1))
Ao: Absolute value of the output-side absolute value encoder 7 (0 to (Ro−1))
Rg: Reduction ratio of the reduction gear
Na: Actual number of rotations (0 to (Rg−1))
Nt: Provisional number of rotations (0 to (Rg−1))

Figure 9:
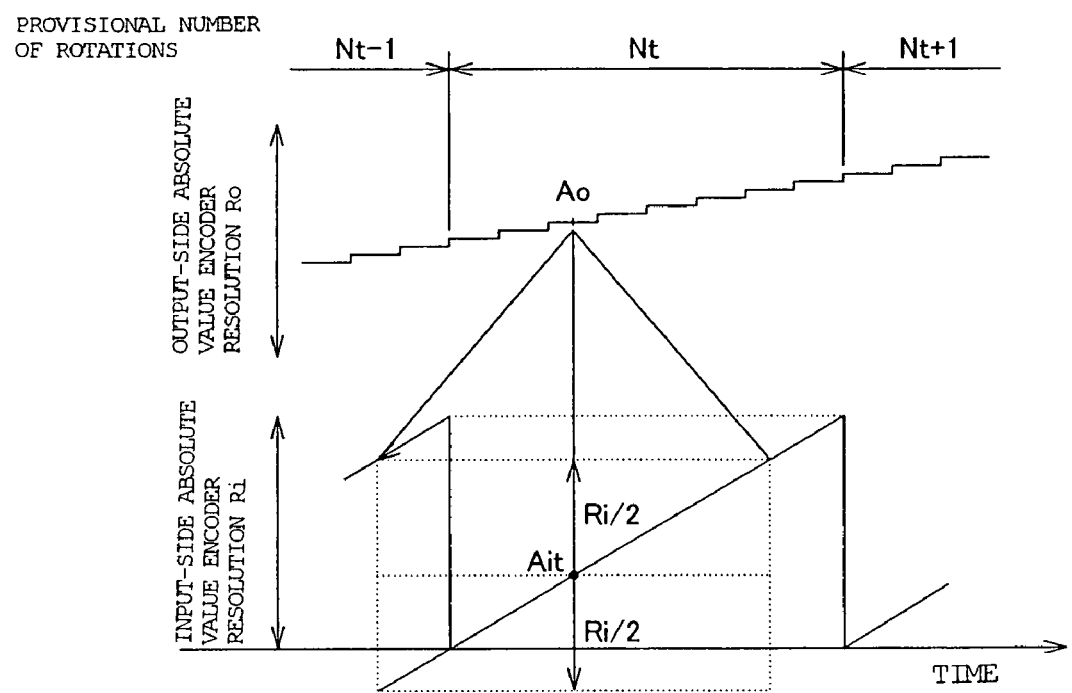
FIG. 9 is a descriptive diagram showing another method for computing the number of rotations of the motor shaft in the geared motor of FIG. 5.
Figure 10:
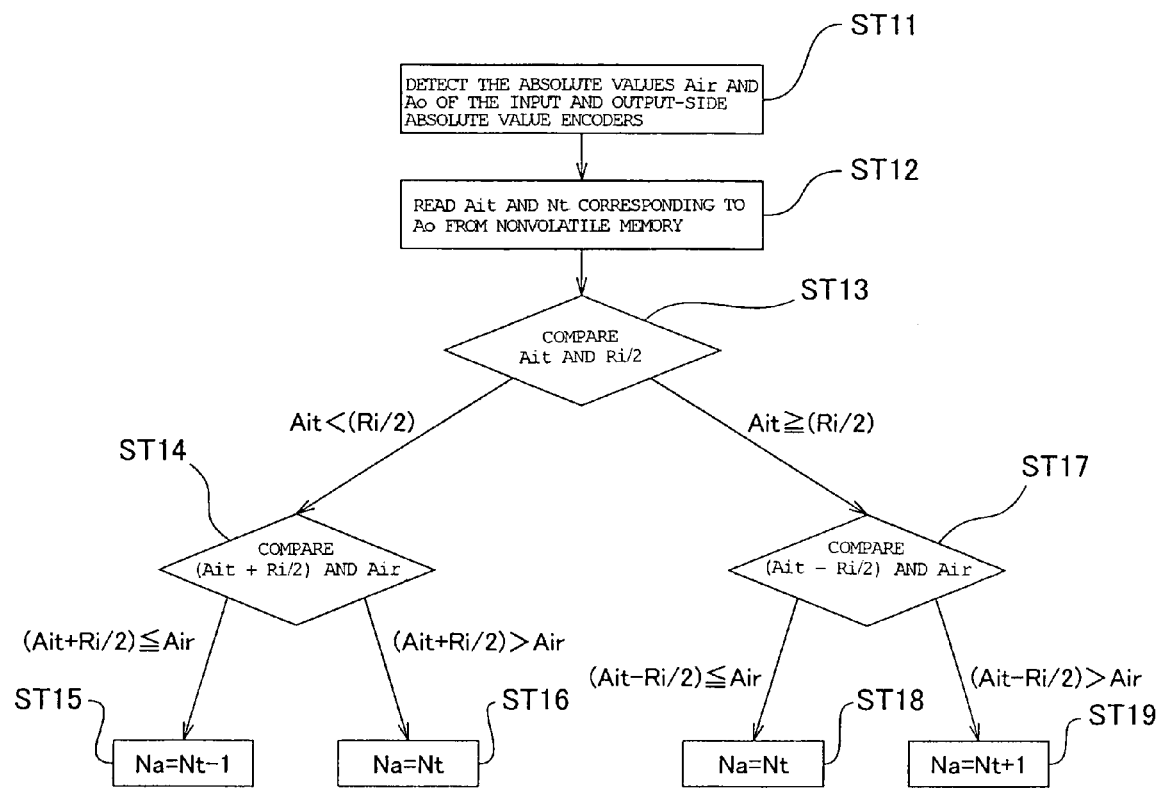
FIG. 10 is a descriptive diagram showing the computational flow of the method for computing the number of rotations of the motor shaft of FIG. 9.
Figure 11:
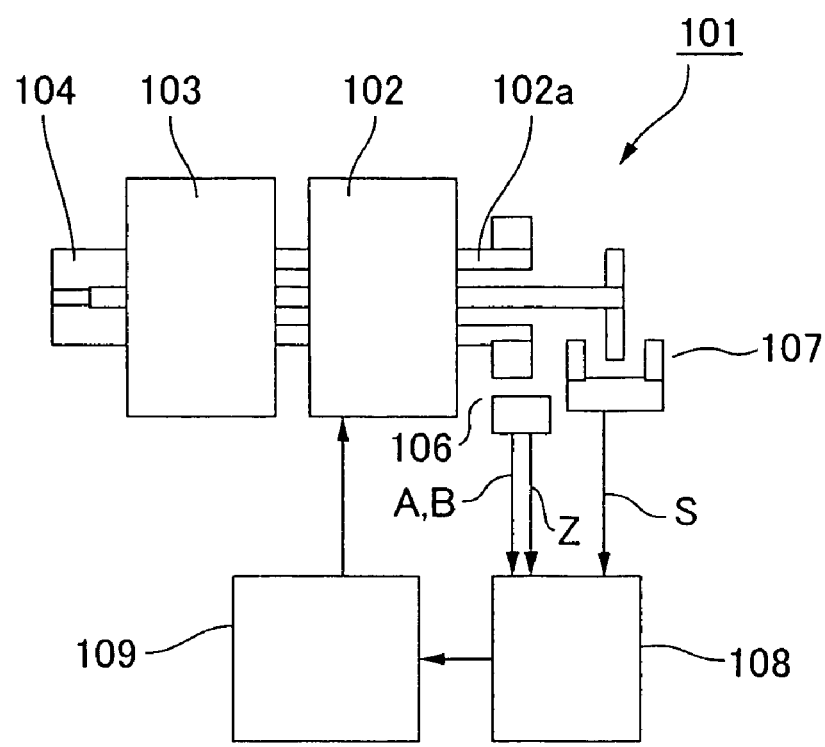
FIG. 11 is a schematic structural diagram of a conventional geared motor.
Figure 12:
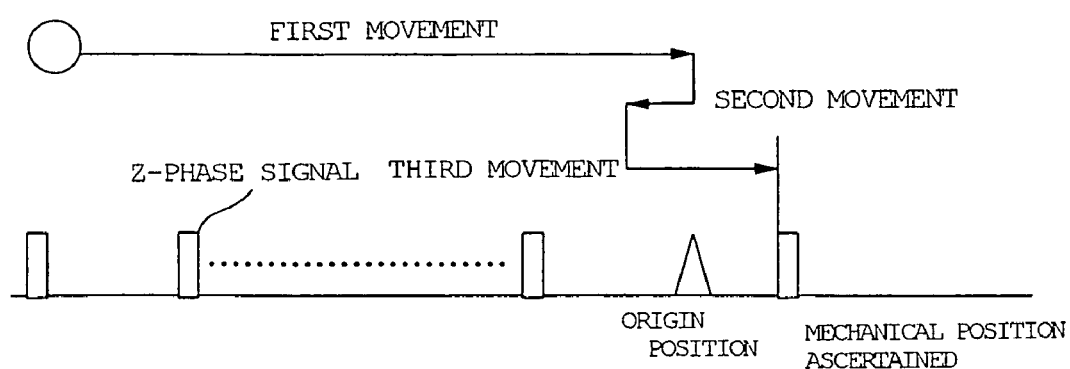
FIG. 12 is a descriptive diagram showing the movements for ascertaining the mechanical starting point of a conventional geared motor.

A description is provided with reference to FIGS. 9 and 10. First, in the geared motor 1A, a provisional absolute value Ait of the input-side absolute value encoder 10 with respect to the absolute value Ao of the output-side absolute value encoder 7 is measured at a known temperature, torque, and speed. A provisional number of rotations Nt is thereafter assigned to the absolute values of the output-side absolute value encoder 7 (step ST11 of FIG. 10).

By storing the information in the nonvolatile memory of the drive control circuit 8, a single provisional absolute value Ait of the input-side absolute value encoder 10 and a single provisional number of rotations Nt can be obtained with respect to a single absolute value Ao of the output-side absolute value encoder 7. However, the actual absolute value Air of the input-side absolute value encoder 10 with respect to the absolute value Ao of the output-side absolute value encoder 7 varies according to the temperature, torque, speed, and other operating conditions, and the relationship is not invariable.

Due to this situation, the absolute value Ait and the number of rotations Nt with respect to the absolute value Ao is read from the nonvolatile memory (step ST12 of FIG. 10), and the absolute value Ait and Ri/2 are then compared (step ST13 of FIG. 10). When the absolute value Ait is less than Ri/2, (Ait +Ri/2) and the actual absolute value Air are compared (step ST14 of FIG. 10). When the value of (Ait+Ri/2) is equal or less than the absolute value Air, the number of rotations Na is set to be Nt−1 (step S15 of FIG. 10). If this is not the case, then the number of rotations Na is set to be Nt (step ST16 of FIG. 10).

In the converse case in which the absolute value Ait is equal to or greater than Ri/2, the value of (Ait+Ri/2) and the absolute value Air are compared (step ST17 of FIG. 10). When the value of (Ait+Ri/2) is equal to or less than the absolute value Air, the number of rotations Na is set to be Nt (step ST18 of FIG. 10). If this is not the case, then the number of rotations Na is set to be Nt+1 (step ST19 of FIG. 10).

As a result of the above, the actual number of rotations Na can be accurately calculated even if the actual absolute value Air of the input-side absolute value encoder 10 with respect to the absolute value Ao of the output-side absolute value encoder 7 varies with respect to the provisional absolute value Ait in an amount equal to ±((Ri/2)−(Ri/(Ro/Rg)).

What is claimed is:

1. A geared motor having: a motor encoder for outputting A-, B-, and Z-phase signals in accompaniment with the rotation of a motor shaft; an output-side absolute value encoder for detecting an absolute rotational position of an output shaft of a reduction gear connected to the motor shaft; and a drive control circuit for obtaining a mechanical starting point of the motor shaft and the output shaft on the basis of a detection value of the motor encoder and the output-side absolute value encoder, wherein the output-side absolute value encoder has a precision that allows a rotational angle of the output shaft per single rotation of the motor shaft to be detected.

2. The geared motor according to claim 1, wherein the drive control circuit computes the mechanical starting point on the basis of the detection angle of the output-side absolute value encoder when a first Z-phase signal obtained from the motor encoder is generated after the motor shaft starts rotation.

3. The geared motor according to claim 2, wherein the drive control circuit carries out origin return movements comprising a first movement in which the motor shaft is rotated in a forward direction at a first speed until the first Z-phase signal is output, a second movement in which the motor shaft if rotated in the reverse direction at a second speed and returned to an angular position just before the Z-phase signal is output, and a third movement in which the motor shaft is rotated in the forward direction at a third speed and the motor shaft is stopped at the point where the Z-phase signal is output, and returns the motor shaft to the mechanical starting point.

4. The geared motor according to claim 2, wherein a rotational position P of the output shaft is set in advance so as to fall within the following range when the Z-phase signal is generated, where $\theta$ is a rotational angle of the output shaft per single rotation of the motor shaft, N is a number of rotations of the motor shaft, and $\Delta$ is a value that is larger than error contained in the detection value of the output-side absolute value encoder.

$$\theta(N-1)+\Delta \leq p \leq \theta N-\Delta$$

5. The geared motor according to claim 4, wherein the drive control circuit computes the number of rotations N of the motor shaft from the detection angle of the output-side absolute value encoder, and a position Px of the output shaft is computed as follows by using a number of rotations N, a rotational angle p of the motor shaft at the point at which said Z-phase signal is generated, and a gear ratio R of the reduction gear.

$$Px+(N\times 360°+p)/R$$

6. The geared motor according to claim 1, wherein the reduction gear is coaxially connected to a front end of the motor shaft, the motor encoder is disposed at a rear-end portion of the motor shaft, and the output-side absolute value encoder is disposed at a rear-end portion of a rotating shaft, which coaxially passes through the motor shaft and extends to a rear-end side thereof from the output shaft.

7. The geared motor according to claim 1, wherein the reduction gear is coaxially connected to a front end of the motor shaft, the motor encoder is disposed at a rear-end portion of the motor shaft, and the output side absolute value encoder is disposed at a front end portion of the output shaft.

8. The geared motor according to claim 7, wherein a determination is made in the drive control circuit as to whether the detection position Pa of the output-side absolute value encoder falls within the following range when the motor shaft begins rotation, where $\theta$ is the rotational angle of the output shaft per single rotation of the motor shaft, N is the number of rotations of the motor shaft, and $\Delta$ is a value that is larger than the error contained in the detection value of the output-side absolute value encoder, $$\theta(N-1)-\Delta \leq Pa \leq \theta N-\Delta$$

the actual number of rotations Na of the motor shaft is set to be N when the detection position Pa is within the range, and the motor shaft is rotated until said detection position Pa is within the range when the detection position Pa is outside the range, and the actual number of rotations Na of the motor shaft is thereafter set to be N.

9. A geared motor having: an input-side absolute value encoder for detecting an absolute rotational position of a motor shaft; an output-side absolute value encoder for detecting an absolute rotational position of an output shaft of a reduction gear connected to the motor shaft; and a drive control circuit for calculating a mechanical starting point of the motor shaft and the output shaft on the basis of the detection value of the input-side absolute value encoder and the output-side absolute value encoder, wherein the output-side absolute value encoder has a precision that allows a rotational angle of the output shaft per single rotation of the motor shaft to be detected.

10. The geared motor according to claim 9, wherein a number of rotations Na of the motor shaft at the start of rotation is computed in the drive control circuit in the following manner in accordance with a detection position p of the input-side absolute value encoder and a detection position Pa of the output-side absolute value encoder at the point at which the motor shaft begins rotation, where $\theta$ is a rotational angle of the output shaft per single rotation of the motor shaft, N is a number of rotations of the motor shaft, and $\Delta$ is a value that is larger than error contained in the detection value of the output-side absolute value encoder, (1) The actual number of rotations Na of the motor shaft is set as N when $\theta(N-1)+\Delta \leq Pa \leq \theta N-\Delta$, (2) When $\theta(N-1)\leq Pa<\theta(N-1)+\Delta$, the number of rotations Na is set to N if p<pn, and the number of rotations Na is set to (N−1) if p>pn, where pn is a predetermined value, (3) When $\theta N-\Delta<Pa<\theta N$, the number of rotations Na is set to N if P>pn, and the number of rotations Na is set to (N+1) if p>pn.

11. The geared motor according to claim 10, wherein the drive control circuit computes the position Px of the output shaft as follows by using the thus calculated number of rotations Na, the detection position p of the input-side absolute value encoder, and the gear ratio R of the reduction gear.

$$Px=(Na\times360°p)/R$$

12. The geared motor according to claim 9, wherein the reduction gear is coaxially connected to the front end of the motor shaft, the input-side absolute value encoder is disposed in a rear-end portion of the motor shaft, and the output-side absolute value encoder is disposed at a rear-end portion of the rotating shaft which coaxially passes through the motor shaft and extends to a rear-end side thereof from the output shaft.

13. The geared motor according to claim 9, wherein the reduction gear is coaxially connected to a front end of the motor shaft, the input-side absolute value encoder is disposed in a rear-end portion of the motor shaft, and the output-side absolute value encoder is coaxially disposed at a front end portion of the output shaft.

* * * * *